United States Patent [19]

Elliott et al.

[11] 4,138,370

[45] Feb. 6, 1979

[54] MULTIPURPOSE LUBRICATING OIL ADDITIVE BASED ON ELECTROPHILICALLY TERMINATED ANION OF OXIDIZED ETHYLENE COPOLYMER

[75] Inventors: Robert L. Elliott, Scotch Plains; J. Brooke Gardiner, Mountainside, both of N.J.

[73] Assignee: Exxon Research & Engineering Co., Florham Park, N.J.

[21] Appl. No.: 720,507

[22] Filed: Sep. 3, 1976

Related U.S. Application Data

[63] Continuation-in-part of Ser. No. 680,077, Apr. 26, 1976, Pat. No. 4,051,050.

[51] Int. Cl.$^2$ .............. C10M 1/26; C10M 1/36; C10M 3/20; C10M 3/30
[52] U.S. Cl. .............. 252/51.5 A; 252/56 R; 252/57
[58] Field of Search .............. 252/52 R, 55, 46.3, 252/46.6, 47.5, 48.2, 49.8, 49.6, 51.5 A, 51.5 R, 50, 56; 260/878

[56] References Cited

U.S. PATENT DOCUMENTS

| 3,272,746 | 9/1966 | Le Suer et al. ............ 252/47.5 |
| 3,544,520 | 12/1970 | Culbertson et al. ............ 252/51.5 R |
| 3,584,082 | 6/1971 | Korpiss et al. ............ 252/49.8 |
| 3,647,691 | 3/1972 | Vineyard ............ 252/47.5 |
| 3,687,849 | 8/1972 | Abbott ............ 252/51.5 A |
| 3,687,849 | 8/1972 | Abbott ............ 252/47.5 |
| 3,842,010 | 10/1974 | Pappas et al. ............ 252/48.2 |
| 3,864,268 | 2/1975 | Culbertson et al. ............ 252/51.5 A |
| 3,872,019 | 3/1975 | Culbertson et al. ............ 252/51.5 R |
| 3,879,304 | 4/1975 | Waldlillig ............ 252/51.5 A |
| 4,036,772 | 7/1977 | Dorer, Jr. ............ 260/878 R |

OTHER PUBLICATIONS

Buehler, et al., Survey of Organic Synthesis, 1970, pp. 215–216.

*Primary Examiner*—Delbert E. Gantz
*Assistant Examiner*—Joan Therstein
*Attorney, Agent, or Firm*—Roland A. Dexter; Frank T. Johmann

[57] ABSTRACT

Multipurpose lubricating oil additives having utility as viscosity index improvers, antiwear agents, sludge dispersants and pour point depressants comprise oil-soluble reaction products of (1) nitrogen compounds having one or more amino groups and/or (2) oxygen compounds having one or more hydroxyl, epoxide or ether groups and/or (3) sulfurizing agent and/or boron compound and/or phosphorous compound with an electrophilically terminated anion of an oxidized copolymer of ethylene and at least one $C_3$–$C_{50}$ alpha monoolefin.

8 Claims, No Drawings

MULTIPURPOSE LUBRICATING OIL ADDITIVE BASED ON ELECTROPHILICALLY TERMINATED ANION OF OXIDIZED ETHYLENE COPOLYMER

RELATED APPLICATIONS

This application is a continuation-in-part to Ser. No. 680,077 filed Apr. 26, 1976 now U.S. Pat. No. 4,051,050.

BACKGROUND OF THE INVENTION

1. Field of the Invention

This invention relates to multipurpose oil-soluble additives for lubricating oils which have utility to impart to an oil when incorporated therein an improved viscosity index and/or sludge dispersancy and/or pour point depressancy and/or oxidation stability and/or metal-wear protection and to the preparation of such additives. Broadly, the novel additives are the reaction products of compounds containing nitrogen, oxygen, sulfur, boron and/or phosphorous with polymers prepared by electrophilic termination of an anion of an oxidized copolymer of ethylene and at least one $C_3$-$C_{50}$ alpha monoolefin, e.g., propylene, which anion had been generated upon contact of the copolymer with a strong base such as butyllithium.

2. Description of the Prior Art

The literature abounds with discussions of multipurpose, i.e., multifunctional, viscosity index (V.I.) improvers usually containing nitrogen to enhance their dispersant activity including polymeric nitrile-containing substances as lubricating oil additives with detergent-dispersant and other properties.

The preparation of such multifunctional V.I. improving polymeric substances containing nitrogen according to the prior art included: free radical-grafting a hydroperoxidized ethylene copolymer with a polar vinylidene monomer, such as acrylonitrile (see U.S. Pat. No. 3,404,091); free radical-grafting an ester of an amino alcohol onto an oxidized interpolymer of ethylene and propylene (see U.S. Pat. No. 3,687,849); and, thermally reacting amines with an oxidized ethylene-propylene copolymer (see U.S. Pat. No. 3,864,268). Free radical grafting has certain disadvantages, including irreversible crosslinking of the copolymer and homopolymerization of monomeric components.

Another approach to preparing an oil-soluble nitrogenous ashless dispersant involves reacting an alkali metal salt of a long-chain ketone with acrylonitrile (see U.S. Pat. No. 3,565,803 and 3,723,501). Unfortunately, formation of the dialkyl ketone precursor is by ozonization which is an expensive and hazardous process involving dimethyl sulfide, an environmentally toxic agent.

Also taught as a multifunctional additive for lubricating oils is the anionic-graft polymer of a lithiated ethylene-propylene-hexadiene terpolymer with an amino methacrylate monomer (see U.S. Pat. No. 3,879,304).

STATEMENT OF THE INVENTION

It has been found that polymeric viscosity improvers can be multifunctionalized to provide enhanced dispersancy by electrophilically terminating the anion of an oxidized copolymer of ethylene and one or more $C_3$ to $C_{50}$, preferably $C_3$ to $C_{18}$, alpha monoolefins with a $C_3$ to $C_{50}$, reactant containing an imine structure. It has also been found that other electron seeking groups of electrophilic terminating compounds can be utilized to react with the copolymer anion to introduce reactive sites. These sites can in turn be derivatized to provide multifunctionality, e.g., aminated in order to introduce nitrogen into the copolymer for enhanced dispersancy. The electrophilic terminating compound is characterized by a structural group which contains a carbon atom doubly bonded to an oxygen, sulfur or nitrogen heteroatom, e.g., an inorganic compound such as carbon monoxide or an organic compound such as acetone.

This finding has, in accordance with this invention, made possible the realization of a new class of multifunctionalized polymeric products containing oxygen, nitrogen, sulfur, boron and/or phosphorous characterized by an electrophilically terminated, oxidized ethylene copolymer portion which have utility as additives for lubricating oil compositions.

In their preferred form, this novel class of products can be characterized as oil-soluble nitrogen-containing polymers formed either directly (as with a ketimine) or indirectly (from subsequent amination) from an electrophilic termination of an anion of an oxidized copolymer of ethylene and at least one $C_3$-$C_{50}$ alpha olefin monomer.

In their optimum form, the products of the invention are oil-soluble, nitrogen-containing copolymers of ethylene and propylene having a number average molecular weight ($\overline{M}n$) of from 1,000 to about 500,000 and containing from about 0.005 to 4%, preferably 0.05 to 2%, optimally 0.1 to 1.0%, by weight of nitrogen, and from 0.005 to 6% by weight of oxygen which demonstrate outstanding dispersancy and have utility as ashless sludge dispersants.

Thus the invention in one aspect can be described as oleaginous, e.g., lubricating oil, compositions comprising a lubricating oil and at least a minor but effective proportion, e.g., from about 0.01 to 20 wt. %, of an oil-soluble polymeric product, said product comprising the derivatized reaction product of a nitrogen compound having one or more amino groups, or an oxygen compound having one or more amino groups, or an oxygen compound having one or more hydroxyl, epoxide or ether groups or elemental hydrogen or a sulfur compound or a boron compound or an organophosphonate with an electrophilically terminated anion of an oxidized copolymer of ethylene and at least one $C_3$ to $C_{50}$ alpha monoolefin, said electrophilic terminating group being a carbon atom doubly bonded to a heteroatom of the class consisting of oxygen, sulfur and nitrogen, said copolymer containing from about 0.005 to 6 wt.% oxygen and having a number average molecular weight ($\overline{M}n$) of from about 1,000 to about 500,000 (preferably from about 1,000 to 10,000 for dispersant applications and from about 10,000 to 500,000 for V.I. improver-dispersant and anti-wear applications). Thus, for the former application, said anionic-graft polymer will be present in said lubricating oil in at least a dispersing amount and for the latter application in at least a V.I. improving amount. The derivatized electrophilically terminated copolymers of the invention are suitable for lubricating oil applications when they possess sufficient oil-solubility, i.e., at least about 10 wt. % at 20° C. based on the total weight of the lubricating oil composition; however, when oil-insoluble the aforesaid derivatized and non-derivatized copolymers of the invention have application as oil-resistant rubbers in seals and gaskets for automobile automotive transmissions, thermoset resins for encapsulating electronic devices, etc., or other uses as will be apparent from the following discussion wherein it will be shown that the electrophilic termination provides a means for incorporating a wide diversity of heteroatoms, e.g., sulfur, nitrogen, boron, phosphorous, and oxygen, into an oxidized ethylene copolymer.

The Copolymer

The term "copolymer" as used herein and in the appended claims, refers to copolymers derived from essentially ethylene and propylene; however, such copolymers may contain minor amounts, i.e., up to 20 mole percent, preferably about 1 to about 7 mole percent based on the molar amounts of the monomeric ethylene and propylene units in the copolymer, of polymerized units derived from other olefin monomers. Such other olefin monomers include olefins of the general formula $RCH = CH_2$, in which R is an aliphatic or cycloaliphatic radical of from 2 to about 48 carbon atoms, for example, 1-butene, 1-pentene, 4-methyl-1-pentene, 1-hexene, 1-heptene, 1-octene, 1-nonene, 1-decene, 4-methyl-1-nonene, 5,5-dimethyl-1-pentene; 5-methyl-1-hexene; 4-methyl-1-heptene; 5-methyl-1-heptene; 6-methyl-1-heptene, 4,4-dimethyl-1-hexene; 5,6,6-trimethyl-1-heptene, etc. Such other olefins also include monomers having a plurality of double bonds, in particular diolefins containing from about 4 to about 26 carbon atoms, e.g., 1,3-butadiene, 1,4-pentadiene, 2-methyl-1,5-hexadiene, 1,7-octadiene, etc., and preferably non-conjugated diolefins such as vinylidene norbornene, 5-methylene-2-norobornene, 5-ethylidene-2-norbornene and 1,4-hexadiene.

Suitable ethylene copolymers contain from about 2 to about 98 wt. % of ethylene and one or more $C_3$ to $C_{50}$ alpha-monoolefins, preferably propylene with a degree of crystallinity of less than 25 weight % as determined by X-ray and differential scanning calorimetry. More usually the ethylene-propylene copolymers contain from about 20 to about 80, preferably from about 35 to about 65 mole percent propylene and have a number average molecular weight ($\overline{Mn}$) of from about 1,000 to about 500,000, preferably about 10,000 to about 200,000, optimally from 20,000 to 100,000.

Methods of preparation of the copolymers are well known including descriptions of U.S. Pat. Nos. 2,700,633; 2,726,231; 2,792,288; 2,933,480; 3,000,866; 3,063,073; 3,093,621 and literature reviews such as "Polyolefin Elastomers Based on Ethylene and Propylene", of F. P. Baldwin and G. VerStrate in Rubber Chem. & Tech., Vol. 45, No. 3, 709–881, (1972) and "Polymer Chemistry of Synthetic Elastomers", edited by Kennedy and Tornqvist, Interscience, N.Y., 1969.

In accordance with this invention, these copolymers which as indicated include terpolymers, for example, a terpolymer of ethylene, propylene and a non-conjugated diene such as 5-ethylidine-2-norbornene can be anionically polymerized according to the invention provided the terpolymer is suitably oxidized whereby sites for graft polymerization are created. Ethylene-propylene-non-conjugated diolefin terpolymers are known articles of commerce, including VISTALON®, an elastomeric copolymer of ethylene, propylene and 5-ethylidene-2-norbornene, marketed by Exxon Chemical Co., New York, N.Y., and Nordel®, a copolymer of ethylene, propylene and 1,4-hexadiene, marketed by E. I. duPont de Nemours & Co., Wilmington, Delaware.

Oxidation of the Copolymer

The oxidation can be accomplished by contacting the copolymer under suitable conditions of temperature and at atmospheric or elevated pressures, with an oxidizing agent such as air or free oxygen, or any oxygen-containing material capable of releasing oxygen under the oxidation conditions. If desired, the oxidation can be conducted in the presence of known oxidation catalysts such as platinum or a platinum group metal, and compounds containing metals such as copper, iron, cobalt, cadmium, manganese, vanadium, etc. The oxidation can be carried out by methods described in U.S. Pat. Nos. 2,982,728; 3,316,177; 3,153,025; 3,365,499; 3,544,520 and 3,864,268.

Generally, the oxidation can be carried out over a wide temperature range depending upon the activity of the agent used; for example, with air, temperatures in the range of 35°–425° C. have been used. Further, depending upon the rate desired, the oxidation can be conducted at sub-atmospheric, atmospheric or super-atmospheric pressures, and in the presence of a copolymer solvent. The conditions of temperature, pressure, oxygen content of the oxidizing agent, the rate of introducing the oxidizing agent, the catalyst employed, if any, etc., are correlated and controlled by those skilled in the art, so as to obtain the desired optimum results.

Oxidation of the copolymers and terpolymers dissolved in a solvent such as mineral oil is conveniently carried out, either in batches or continuously, in a stirred reactor with air, or air prediluted with an inert gas such as nitrogen or carbon dioxide so as to minimize explosion hazards. The air, or diluted air, may be introduced into the oil-polymer solution in a finely divided state through the use, for example, of sparger tubes fitted with porous ALUNDUM®, or fritted gas thimbles, or similar means possessing a forminiferous-like structure, at a temperature in the range of about 80° C. to 300° C., preferably 100° C. to 230° C. Rapid agitation of the reactor contents, as for example, by means of a turbomixer, is desirable in large batches, to ensure an optimum reaction rate and a low oxygen content in the off-gas.

In general, in the range of 0.5 to 90, e.g., 4 to 60 weight percent of the oil copolymer solution will be copolymer. Usually, about 20 to 60 weight percent of the solution will be copolymer when the polymer is of low mol. wt., e.g., with a number average molecular weight ($\overline{Mn}$) less than 20,000. For copolymers with $\overline{Mn}$ equal to or greater than 20,000, the preferred concentrations are in the range of 4 to 20 weight percent copolymer, based on the total weight of the oil-copolymer solution.

A wide variety of mineral lubricating oils which widely range in viscosity and crude source, may be used as solvents for the polymer-oil solutions to be oxidized. The oils may be derived from Pennsylvania, Midcontinent or Coastal crudes, Middle East crudes, Venezuelan crudes, etc., and may range in viscosity from about 5 to 1000 SUS at 38° C., preferably 10 to 600 SUS at 38° C., most preferably 80 to 200 SUS at 38° C. They may be straight-run distillates in the lubricant range, e.g., boiling above 315° C., or may have been further refined by deasphalting; dewaxing; solvent extracted; treated with sorbents; or refined by hydrogenation; etc. Also suitable are synthetic hydrocarbon oils in the lubricant range made by polymerization, oligomerization, alkylation of aromatics with olefins, and the like.

Oxidation of the oil-copolymer solution is conducted for a time sufficient to impart to the solution a combined oxygen content of about 0.01 to 10.0, whereby the copolymer has an oxygen content ranging from 0.005 to 6 wt.% e.g., 0.1 to 8, preferably 0.1 to 5.0 weight percent, depending on the composition of the oil, the copolymer and the concentration of copolymer in solution. One approach to measuring and/or monitoring the degree of oxidation is by means of the specific absorption exhibited by oxygen containing group functionality about 5.8 microns in the infrared. As used herein, such terms as "oxidized", or "oxidized oil copolymer solution", etc., indicate that air or oxygen containing gas is preferably used for the oxidation, and does not preclude the use of other oxidative reagents such as ozone.

Alternatively, the copolymer can be oxidized in the absence of a solvent as by oxidative degradation of the copolymer. This oxidation approach is well known in the art (see French application No. 75,23806) whereby oxygen is incorporated into the copolymer by an air-mastication procedure. This procedure may be done with a single piece of equipment or in stages. Useful equipment includes Banbury mixers and mills wherein the copolymer is readily exposed to air, which devices may be enclosed in jacketed containers through which a heating medium may be passed such as superatmospheric steam, or heated DOWTHERM®. When oxidation resulting from the air-mastication has reached a desired level, i.e., at least about 0.005 wt. % oxygen as determined by oxygen uptake in said copolymer, mineral oil may be added to provide a concentration of the oxidized copolymer in the range of about 5 weight percent to 50 weight percent based on the weight of the total resulting solution. The resulting oil solution may thereafter be reacted with an alkyllithium compound to yield an anionic solution of the resultant copolymer.

Where oxidation is provided by this air-mastication process, the copolymer is preferably limited to ethylene and one or more alpha-monoolefins having from 3 to 50 carbons and preferably, propylene, to avoid deleterious cross-linking during oxidation.

Regardless of the oxidation process, the oxidized ethylene copolymer contains from about 0.005 to 6, preferably 0.05 to 3, wt. % oxygen based on the total weight of said polymer.

Preparation of the Anion of Oxidized Copolymer

Usually the formation of the anion is carried out in an inert solvent which can be retained for electrophilic termination and, if desired, for derivatization to produce the multifunctional polymer products. These solvents may be polar or non-polar. Illustrative hydrocarbon solvents include benzene, toluene, cumene and preferably hydrocarbons of from 6 to 10 carbon atoms such as hexane, cyclohexane and heptane. Other solvents include ethers, both aliphatic and aromatic such as diethyl ether, and dimethyl ether with tetrahydrofuran being preferred. Individual solvents or mixtures may be used. A highly useful solvent is mineral oil or mixtures thereof in which the anionic oxidized copolymer is generally prepared.

The anion is readily prepared by contacting said oxidized copolymer in a solvent with an alkyl lithium compound of from 3 to 10 carbons. This contacting is conducted under anhydrous conditions (less than 0.01 wt. % water), under an inert atmosphere, e.g., nitrogen and at a temperature between about 20° and 100° C., normally for a period of between 1 and 25 hours. The contacting employs between about 1.0 and 200 millimoles alkyl lithium/100 g. of said oxidized copolymer. The requisite amount of catalyst is determined by the amount of carbonyl functionality of said oxidized copolymer.

The anion of said oxidized ethylene copolymer is contacted with the electrophilic terminating compound, i.e., reagent to yield said electrophilically terminated copolymer.

Electrophilic Terminating Compound

Broadly, the electrophilic terminating compounds contemplated by the present invention contains a carbon atom doubly bonded to a heteroatom of the class consisting of oxygen, sulfur and nitrogen, whereby an electron-seeking chemical structural moiety or group is present to react with the anion of said oxidized copolymer. In its organic compound classification, said terminating compounds will generally consist of 1 to 60 carbon atoms and contain electron-seeking group of the formula $>C=X$ wherein X is oxygen, sulfur and nitrogen (either as NH or substituted N), selium or tellurium and if desired may contain additional heteroatoms (to provide functionality) such as nitrogen (preferred herein), oxygen, sulfur, boron, phosphorous, silicon, lithium, etc. Thus, it is to be understood that the electrophilic terminating compounds may contain substituent groups such as ketone, hydroxyl, ether, mercapto, sulfide, sulfoxide, sulfonyl, etc. Generally, these compounds will contain about 1 to 60, preferably 1 to 30 carbon atoms and at least one electron-seeking group to create an electrophilic site.

A preferred class of electrophilic terminating compounds can be represented by the formula:

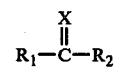

wherein X represents O, S or $NR_3$ and $R_1$, $R_2$ and $R_3$ may be the same or different and are individually selected from the group consisting of hydrogen, $C_1$ to $C_{30}$ (preferably $C_1$ to $C_6$) straight and branched chain alkyl, arylalkyl, cycloalkyl, alkenyl, aryl-alkenyl and cycloalkenyl moieties and/or one or more reactive groups of the class consisting of alkyl unsaturation, carboxyl, epoxide, thiol, carbonyl, isocyanate, thionyl, amido, hydroxy, imino, acylhalide, halo, dicarboxylic acid anhydride, thiolic anhydride, thionic anhydride, dithionic anhydride, disubstituted amino, trisubstituted amino, ureido, isourea and dicarboxylamic acid anhydride or one-half of cyclic dicarboxylic acid anhydrides as in maleic anhydride or one-half of cyclic thiolic anhydride or one-half of cyclic thionic anhydride or one-half of cyclic dithionic anhydride or one-half of cyclic dicarboxylic amic acid anhydride or one-half of cyclic N $C_{1-18}$ hydrocarbyl imides such as N-dodecylmaleimide.

Another useful class of electrophilic terminating reagents are $C_1-C_{20}$ acyclic compounds having a single electron-seeking group of the class consisting of carbonyl ($>C=O$), thiocarbonyl ($>C=S$), carbonimidonyl ($>C=NH$) and substituted carbonimidonyl ($>C=NR_4$ wherein $R_4$ is a polyalkylene-polyamiosubstituent containing from 2 to 8 carbons and from 1 to 4 nitrogens).

Suitable electrophilic terminating compounds thus include: ketones such as acetone, methylethyl ketone, diethyl ketone, dimethyl ketone, valerone, palmitone, stearone and ketoxime (nitrogen containing ketone), etc.; aldehydes such as acetaldehyde, formaldehyde, paraldehyde, propionaldehyde, lauric aldehyde, etc.; acid halides such as acetyl chloride, phosgene, carbamoyl chloride, methyl chloroformate, stearyl chloride, lauryl chloride, N,N-dimethylcarbamoyl chloride, thiophosgene, thioacetyl chloride, etc.; other carbonyl and thiocarbonyl containing reagents such as urea, ethyl carbamate, O-ethyl thiocarbamate, hexanethiol, cyclohexane carbothialdehyde, thiobenzamine, etc.; and, acid anhydrides such as acetic anhydride, propionic anhydride, palmitic anhydride etc.

Other terminating compounds are maleic anhydride and tetracyanoethylene where cross-linking of said electrophilically terminated copolymer may be desired.

A preferred class of carbonimidoyl type, electrophilic terminating compounds may be represented by the formula

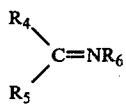

wherein $R_4$ and $R_5$ are individually selected from hydrogen and $C_1$–$C_{30}$, preferably $C_1$–$C_6$, alkyl groups and $R_6$ represents an amine group having from 1 to 59 carbons and 1 to 11 nitrogens and preferably represents a polyalkylene polyamine having from 2 to 15 carbons and from 2 to 5 nitrogen atoms for this class possesses both an electron-seeking group and nitrogen functionality whereby dispersancy of the electrophilically terminated copolymer is enhanced. Such compounds are aldimines or ketimines added in an at least equimolar equivalent of said anionic copolymer and in weight proportion which may vary from 0.1 to 10%, based on the weight of said copolymer. The aldimine or ketimine are formed by the known reactions of an aliphatic or aromatic aldehyde or ketone, respectively with an amine. A non-limiting number of suitable aldehydes and ketones would be acetaldehyde, propionaldehyde, butyraldehyde, acetone, methyl ethylketone, etc. Useful amine compounds include amines of about 0 to 60, preferably 0 to 20, total carbon atoms and about 1 to 12, preferably 1 to 6, nitrogen atoms in the molecule, which amines may be hydrocarbyl amines or may include other groups such as hydroxy groups, alkoxy groups or amide groups. Preferred amines are aliphatic amines, including those of the general formula:

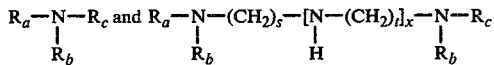

wherein $R_a$, $R_b$ and $R_c$ are independently selected from the group consisting of hydrogen and $C_1$ to $C_{12}$ straight or branched chain alkyl radicals; s is a number from 2 to 6, preferably 2 to 4 and x and t are independently 0 to 10, preferably 2 to 6. Examples of suitable amines include: ammonia, methyl amine, ethylene diamine, diethylene triamine, triethylene tetramine, tetraethylene pentamine, polyamine, etc. Another suitable class of compounds would be amines containing aldehydes or ketones. Examples of suitable compounds include urea, ethyl carbamate, N,N-dimethylcarbamoyl chloride, etc.

Another suitable class of terminating compounds are inorganic compounds which electrophilically quench the copolymer anion and thus introduce additional reactive sites. A non-limiting number of suitable examples would be CO, $CO_2$, $CS_2$, $SO_2$, cyanogen bromide, etc. The resultant electrophilically terminated anionic polymers can be further reacted with functionalizing heteroatoms, e.g., nitrogen in amines such as those earlier described for preparation of aldimines and ketimines. Specific examples of preferred amines include diethylenetriamine, tetraethylene pentamine, polyamines, etc.

The electrophilic terminating reagent may be added either batchwise or incrementally to the oxidized ethylene copolymer anion solution. Preferably, the reagent is added incrementally with vigorous stirring so as to obtain relatively homogeneous diffusion of the terminating reagent into the reaction mixture. The termination of the anionic copolymer by the electrophilic terminating group is carried out generally in the range of between about 0° and about 100° C., preferably about 20° C. to 50° C. with agitation. The time of reaction varies between about 0.2 and about 15 hours, preferably between about 0.5 and about 5 hours. The counter ion will be preferably an alkali metal such as lithium, sodium or potassium with lithium preferred. Suitable organolithium compounds may be represented by the formula RLi wherein R is a $C_2$ to $C_{20}$ alkyl, aralkyl, or cycloalkyl group. Specific examples of suitable catalysts include n-propyllithium, isopropyllithium, n-butyllithium, tertiary butyllithium, etc., with n-butyllithium being preferred.

The preparation of the electrophilically terminated copolymer from the oxidized copolymer is theorized to occur by abstraction of the acidic proton located alpha to a carbonyl structure present in the oxidized polymer. Oxidation of the ethylene copolymer is believed to introduce a multiplicity of complex carbonyl structures such as keto-, aldo-, acido- into the backbone of the polymeric molecules. Preparation of the anion of the oxidized copolymer does not measurably alter these carbonyl structures.

The proportions in which the above-described electrophilic terminating reagents are to be used may range widely according to the ability of said oxidized copolymer and said reagent to react with each other, but normally should range from about 0.1 to 400, preferably about 10 to about 200 parts by weight of said reagent to 100 parts by weight of said oxidized copolymer (said oxidized copolymer containing from about 0.005 to 6 wt. %, preferably 0.01 to 3 wt. % oxygen). Generally it is useful to fully terminate the anion of said oxidized copolymer so that at least one molar equivalent of said reagent is reacted with one molar equivalent of said anion preferably from 1.0 to 1.5 molar equivalent of said reagent per molar equivalent of said anion.

Derivatization (Post Electrophilic Termination Reactions)

For the purposes of this patent, we envisage that the electrophilic terminated copolymer (hereafter called E.T. copolymer) will be reacted with hydrogen or nitrogen, oxygen, sulfur, boron and/or phosphorous containing compounds to form multifunctional products. For example, polyamines, such as diethylene triamine can be reacted with halogen, acid halides, isocyanate, carboxyl, ketone, anhydride, ester, acidic sulfur and epoxy E.T. copolymer reactive groups to obtain dispersancy. Likewise polyhydroxy compounds such as pentaerythritol, trimethylol propane, or polyalkenyloxide glycols can be reacted with carboxyl acid halides and anhydrides, isocyanate, epoxy and acidic sulfur E.T. copolymer groups to provide dispersancy.

Likewise long chain alkyl amines or hydroxy compounds such as dodecyl alcohol or amine can be reacted as above to confer pour depressant activity on the E.T. copolymer.

Reduction of reducible groups such as nitrile, amides, ketimines, imides, esters, carbonyls, etc., by hydrogen can be accomplished leading to amines which confer dispersant properties. This reduction can be by elemental hydrogen under catalytic conditions, temperature, and pressure or by organic hydrides, inorganic hydrides and other equivalent methods well known in the art.

Unsaturated groups provided in said terminating reagent can be utilized in a variety of ways, e.g., reaction with halogens, n-halo compounds, or hydrogen halides to give either vicinal halides or allylic substitution. These halogen substituents can then be displaced by reaction with amines providing dispersancy to the E.T. copolymer. Reaction of unsaturation groups in the E.T. copolymer with $P_2S_5$ or sulfur or sulfonating agents is contemplated. $P_2S_5$ or sulfur adducts can provide atioxidant functionality to said E.T. copolymer. Sulfonating agents provide sulfonic acid groups which can provide detergent activity and can permit suspension with colloidal metal carbonates. Further reaction of a hydroxy containing E.T. copolymer with $P_2S_5$ provides acidic groups that can be reacted with zinc to form zinc dithiophosphonates which are well known in the art to give wear protection.

COREACTANTS FOR DERIVATIZATION

A. Nitrogen Compounds

Nitrogen compounds having one or more amino groups which are useful for reaction with the electrophilically terminated polymers of this invention include mono- and polyamines of about 2 to 60, e.g., 3 to 20 total carbon atoms and about 1 to 12, e.g., 2 to 6 nitrogen atoms in the molecule. The amine compounds may be hydrocarbyl amines or may include hydroxy groups, alkoxy groups, amide groups or may be cyclic in structure such as imidazolines and the like. Preferred amines are aliphatic, saturated amines, including those of the general formula:

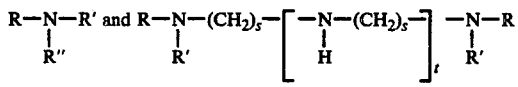

wherein R, R' and R" are independently selected from the group consisting of hydrogen; $C_1$ to $C_{12}$ straight or branched chain alkyl radicals; $C_1$ to $C_{12}$ alkoxy $C_2$ to $C_6$ alkylene radicals; $C_2$ to $C_{12}$ hydroxy or amino alkylene radicals; and $C_1$ to $C_{12}$ alkylamino $C_2$ to $C_6$ alkylene radicals; s is a number of from 2 to 6, preferably 2 to 4; and t is a number of from 0 to 10, preferably 2 to 6.

Non-limiting examples of suitable amine compounds include: mono-, di- and tri-tallow amines; 1,2-diaminoethane; 1,3-diaminopropane; 1,4-diaminobutane; 1,6-diaminohexane; diethylene triamine; triethylene tetramine, tetraethylene pentamine; 1,2-propylene diamine; di-(1,2-propylene) triamine, di-(1,3-propylene) triamine; N,N-dimethyl-1,3-diaminopropane; N,N-di-(2-aminoethyl) ethylene diamine; N,N-di-(2-hydroxyethyl)-1,3-propylene diamine; 3-dodecyloxypropylamine; N-dodecyl-1,3-propane diamine; tris-hydroxymethyl aminomethane, diisopropanol amine, and diethanol amine.

Other useful amine compounds include: alicyclic diamines such as 1,4-bis-(aminomethyl) cyclohexane, and heterocyclic nitrogen compounds such as imidazolines and N-aminoalkyl piperazines of the general formula:

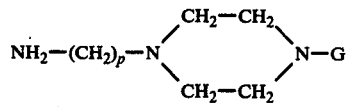

wherein G is independently selected from the group consisting of hydrogen and Ω aminoalkylene radicals of from 1 to 3 carbon atoms; and p is an integer of from 1 to 4. Nonlimiting examples of such amines include 2-pentadecyl imidazoline, N-(2-aminoethyl) piperazine; N-(3-aminopropyl) piperazine; and N,N'-di-(2-aminoethyl) piperazine.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogen are joined by alkylene groups, forming such compounds as diethylene triamine, triethylenetetramine, tetraethylene pentamine and isomeric piperazines. Low cost poly(ethyleneamines) compounds having a composition approximating tetraethylene pentamine are available commercially under the trade name Polyamine 400 (PA-400), marketed by Jefferson Chemical Co., New York, N.Y. Similar materials may be made by the polymerization of aziridine, 2-methyl aziridine and azetidine.

Still other amines with amino groups separated by hetero atom chains such as polyethers or sulfides can be used.

B. Oxygen Coumpounds

Oxygen compounds having one or more hydroxyl, epoxide or ether groups which are suitable for derivatization of the electrophilically terminated copolymers or with amine adducts or reaction products of said E.T. copolymers include: $C_6$ to $C_{18}$ straight or branched-chain primary alcohols; polyethylene or polypropylene glycols having the general formula: $HO(CH_2-CH(R)O)_mH$ wherein R is hydrogen or a methyl radical and m is an integer in the range of 1 to 10; oxiranes having the general formula:

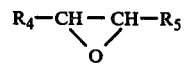

wherein $R_4$ and $R_5$ are independently selected from the group consisting of hydrogen, $C_1$ to $C_{12}$ alkyl radicals and $C_6$ to $C_9$ aryl and alkylaryl radicals; polymethylol alkanes such as tris(hydroxymethyl)-1,1,1-propane and pentaerythritol and compounds having both amine and hydroxyl functionality such as tris(hydroxymethyl) methylamine which itself produces oxazoline ring structure when heated together with the E.T. copolymer at about 180° C. for 4 hours.

C. Sulfur Compounds

The patent literature teaches of ashless lubricant additives obtained by treating polymers with $P_2S_5$ followed by amination with an aliphatic polyamine to improve the dispersancy and detergent properties of the lubricating oil (see U.S. Pat. Nos. 3,143,506 and 3,329,612). It is possible to similarly treat the E.T. copolymers described herein and obtain enhanced dispersancy and detergency. Briefly the process involves reacting said E.T. copolymer with a sulfurizing agent, e.g., treatment with $P_2S_5$ for 6 hours at 200° C., followed by treatment of the resulting product with a hydrolyzing agent and neutralizing agent. The sulfurizing agents include phosphorus sulfides, sulfur, and combinations of those with phosphorizing agents such as phosphorus chloride, phosphorus pentoxide and phosphorus. An illustrative combination of sulfurizing and phosphorizing agents is sulfur and phosphorus pentachloride.

The structure of these sulfur derivatized interpolymers is not fully known; however, it is commonly believed to be a mixture of different types of acids after hydrolysis including those having carbon to sulfur bonds, carbon to oxygen to sulfur bonds and carbon to sulfur to phosphorus bonds.

Neutralization can be carried out to a wide range of basicity, i.e., it can partially neutralize to the acid salt or fully neutralize to a basic salt. Representative of these extremes would be sulfonation of the salt with chlorosulfonic acid to yield an acidic metal salt and neutralization with a stoichiometric excess of barium oxide in the presence of a solvent followed by carbonation and filtration.

Neutralization of $P_2S_5$ treated hydroxy containing E.T. copolymers by zinc oxide yield polymeric load carrying agents and antioxidants.

D. Boron Compounds

The new boron-containing derivatives may be obtained by reacting the E.T. copolymer having alkoxy, carboxy, etc., groups with boric acid or organo-borates of the formula:

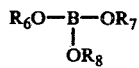

wherein $R_6$, $R_7$ and $R_8$ are individually hydrogen or a hydrocarbyl group having 1 to 20 carbon atoms such as alkyl, cycloalkyl, aryl, aralkyl and alkaryl, including methyl, ethyl, propyl, butyl, phenyl, tolyl, benzyl and the like. Boric acid, wherein $R_6$, $R_7$ and $R_8$ are all hydrogen, is the most preferred. It is not fully understood what the resulting structure of these boron-containing derivatives may be; however, it is known that there is chemical bonding resulting between said boron compounds and the functional groups of the E.T. copolymer.

E. Phosphorus Compounds

Another class of co-reactants usefully reacted with E.T. copolymers to provide lubricating oil additives are the organophosphonates having the formula:

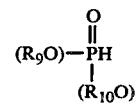

wherein $R_9$ and $R_{10}$ are individually selected from hydrocarbyl groups having 1 to 20 carbons. Suitable phosphonates include dimethylphosphonate, diethylphosphonate, dibutylphosphonate, dihexylphosphonate, diphenylphosphonate, ditolylphosphonate, and dinonylphenylphosphonate. Preparation of these phosphonates is known and described in U.S. Pat. No. 3,329,742. They can be reacted by techniques well known in the art to produce the desired derivatives of the E.T. copolymers.

Of all these derivatives discussed in the foregoing sections, it is preferred to form oil-soluble nitrogen-containing polymers containing about 0.005 to 2%, and preferably about 0.05 to 0.8% by weight nitrogen (all of said % by weight nitrogen values in this specification are determined by the Kjeldahl method). Polymers containing such quantities of nitrogen have sufficient dispersancy sites to impart multifunctionality to said copolymers whereby addition of said polymers enhances the lubricating performance of lubricating oils.

Polymer Applications

Generally, the number average molecular weights of the derivatives of the electrophilically terminated copolymer of the present invention, or the E.T. copolymer itself, employed as lubricant additives, will be in the range of about 1000 to about 500,000 and preferably will be in the range of about 10,000 to 200,000. However, it will be understood that higher or lower molecular weight products may be prepared in accordance with the present invention, if desired. All molecular weight values set forth in this specification are number average molecular weights ($\overline{M}n$) as determined by vapor phase osmometry (VPO) and membrane osmometry (MO).

When the copolymers of the invention are employed in lubricating oils, they are preferably added in proportions of about 0.01 to about 20.0% or more, preferably about 0.1 to 10.0%, and more preferably about 0.5 to 5.0 percent by weight. The proportions giving the best results will vary somewhat according to the nature of said copolymer additives, the nature of the lubricating oil base stock to which it is added and the specific purpose which the lubricant is to serve in a given case. For commercial purposes, it is convenient to prepare concentrated oil solutions in which the amount of said copolymer in the composition ranges from 20 to about 80% by weight, and to transport and store them in such form. In preparing a lubricating oil composition for use as a crankcase lubricant, the additive concentrate is merely blended with the base oil in the required amount.

The products of the present invention may be employed not only in ordinary hydrocarbon lubricating oils but also in the "heavy duty" type of lubricating oils which have been compounded with such detergent type additives as metal soaps, metal phenates, metal alcoholates, thiophosphates, amines and amine derivatives, reaction products of metal phenates and sulfur, reaction products of metal phenates and phosphorus sulfides, metal phenol sulfonates and the like. The polymeric additives of the present invention may be used in lubricating oils containing other additives such as barium nonyl phenol sulfide, nickel oleate, barium octadecylate, calcium phenol stearate, zinc diisopropyl salicylate, aluminum naphthenate, zinc methylcyclohexyl thiophosphate, etc.

The lubricating oil base stocks used in the compositions of this invention may be straight mineral lubricating oils or distillates derived from paraffinic, naphthenic, asphaltic, or mixed base crudes, or, if desired, various blended oils may be employed as well as residuals, particularly those from which asphaltic constituents have been carefully removed. Hydrogenated oils, white oils, or shale oil may be employed as well as synthetic oils prepared, for example, by the polymerization of olefins or by the reaction of oxides of carbon with hydrogen or by the hydrogenation of coal or its products.

For best results, the base stock chosen should normally be that of an oil which (without the new polymer additive present) gives the optimum performance in the service contemplated, e.g., lubricating oils for normal applications have a viscosity which usually ranges from about 40 to 150 seconds Saybolt viscosity at 99° C. but for the lubrication of certain low and medium speed diesel engines the lubricating oil base stock is prepared from naphthenic or aromatic crudes and has a Saybolt viscosity at 99° C. of 45 to 90 seconds and for gasoline engine service, oils of high viscosity index are often preferred, for example, up to 75 to 100, or even higher, viscosity index.

As earlier mentioned, the inventive polymeric additives have utility as pour depressants for hydrocarbons. This utility includes not only lubricating oil applications but also to improve the cold flow properties of distillate hydrocarbon oils, particularly those fuel oils containing a fraction boiling above 370° C. The polymeric additives of the invention can be used alone or in combination with copolymers of ethylene and vinyl esters of lower fatty acids such as vinyl acetate. The inventive copolymeric additive alone or in combination with other polymers are added in cold flow improving amounts, i.e., from about 0.001 to 0.5 wt. % based on the weight of the middle distillate.

The invention will be further understood by reference to the following examples which include preferred embodiments.

EXAMPLE 1

To a stirring solution of 10 grams oxidized (air masticated) ethylene-propylene copolymer (44 wt. % [about 54 mole %] ethylene and 56 wt. % propylene) of 23,000 ($\overline{M}n$) in dry tetrahydrofuran (200 ml.) maintained at ambient temperature and under a nitrogen atmosphere was rapidly added (ca. 10 sec.) 1.5 ml. of a 1.6 molar solution of n-butyllithium in hexane. The mixture was allowed to stir under the same conditions for 1 hour after which time it was treated with 1 ml. of N-diethylene triamine-2-propylidenimine. The solution was slowly heated to 50° C. and additional stirring continued for 2 hours. The reaction was terminated with 2 ml. of methanol, and the polymer isolated by precipitation with a large volume of methanol (1.5 liters). The resulting electrophilically terminated copolymer was washed with additional methanol (500 ml.), then dried in a vacuum oven at 100° C. for 15 hours, after which time 9.4 g. of polymeric product was recovered. The nitrogen level of said product was 0.04 wt. % (Kjeldahl).

EXAMPLE 2

To a stirring solution of 10 grams of oxidized (air masticated) ethylene-propylene copolymer (44 wt. % [about 54 mole %] ethylene and 56 wt. % propylene) of 23,000 ($\overline{M}n$) in dry tetrahydrofuran (200 ml) maintained at ambient temperature and under a nitrogen–atmosphere was rapidly added (ca. 10 sec.) 1.0 ml. of a 1.6 molar solution of n-butyllithium in hexane. The mixture was allowed to stir under the same conditions for 1 hour after which time it was treated with a solution of methylchloroformate (1.2 g) in tetrahydrofuran (25 ml) at ambient temperature. The solution was stirred for an additional 1.5 hours at ambient temperature. To the solution was added 2 ml. of methanol, and the electrophilically terminated copolymer isolated by precipitation with a large volume of methanol (2 liters). The resulting copolymer was washed twice with two 500 ml. portions of additional methanol, then dried in a vacuum oven at 100° C. for 53 hours, after which time 9.0 grams of polymeric product was recovered (yield of 90%). Infrared spectra shows a strong ester band at 1755 cm$^{-1}$.

EXAMPLE 3

Five grams of the functionalized copolymer of Example 2 was dissolved in toluene (100 ml.), then carefully refluxed (110° C.) under a nitrogen atmosphere with a solution of diethylene triamine (DETA), 1 g. in 10 ml. toluene, for 6 hours. The solution was cooled to ambient temperature and the polymer product recovered by precipitation from methanol (1.5 liters). The resulting product was washed with additional methanol (500 ml.) and then dried in a vaccum oven at 100° C. for ca. 15 hours, after which time 4.72 grams of polymeric product was recovered (yield of 94%). The nitrogen level of the resulting polymeric product was 0.28 wt. % (Kjeldahl).

EXAMPLE 4

To a stirring solution of 50 grams of oxidized (air masticated) ethylene-propylene copolymer (44 wt. % [about 54 mole %] ethylene and 56 wt. % propylene) of 23,000 ($\overline{M}w$) in dry tetrahydrofuran (500 ml.) maintained at 40° C. temperature and under a nitrogen atmosphere was rapidly added (ca. 10 sec.) 6 ml. of a 1.6 molar solution of n-butyllithium in hexane. The mixture was stirred under the same conditions for 1.5 hours after which time it was treated with a solution of methylchloroformate (4.9 g) in tetrahydrofuran (35 ml.). The solution was slowly heated to ca. 60° C. and stirred while cooling for 1 hour. To the solution was added 6 ml. methanol, and the electrophilically terminated copolymer isolated by precipitation with a large volume of isopropanol (1.5 liters). The resulting polymeric product was washed with acetone (750 ml.) then dried in a vacuum oven at 100° C. for ca. 15 hours, after which time 47.2 g. of polymeric product was recovered (yield of 94%). Infrared spectra shows a strong ester band at 1755 cm$^{-1}$.

EXAMPLE 5

Five grams of the functionalized polymer of Example 4 was dissolved in xylenes (100 ml.) and then carefully refluxed (140° C.) under a nitrogen atmosphere with a solution of diethylene triamine, 1 g. in 5 ml. xylene for 16 hours. The solution was cooled to ambient temperature and the polymeric product recovered by precipitation from methanol (2 l.). The resulting polymeric product was washed with additional methanol (500 ml.), then dried in a vacuum oven at 100° C. for ca. 15 hours, after which time 4.8 g of polymeric product was recovered (yield of 96%). The nitrogen level of the resulting polymer was 0.20 wt. % (Kjeldahl).

EXAMPLE 6

In this example the efficacy of the derivatized electrophilically terminated copolymers of this invention as dispersants in lubricating oil applications, is illustrated by comparison with a commercially available multifunctional V.I. improver, sold as Lz3702 by Lubrizol Corporation of Cleveland, Ohio, in a Sludge Inhibition Bench Test (hereinafter designated SIB). The SIB test has been found, after a large number of evaluations, to be an excellent test for assessing the dispersing power of lubricating oil dispersant additives.

The medium chosen for the SIB test was a used crankcase mineral lubricating oil composition having an original viscosity of about 325 SUS at 38° C. that had been used in a taxicab that was driven generally for short trips only, thereby causing a buildup of a high concentration of sludge precursors. The oil that was used contained only a refined base mineral lubricating oil, a viscosity index improver, a pour point depressant and zinc dialkyldithiophosphite antiwear additive. The oil contained no sludge dispersant. A quantity of such used oil was acquired by draining an refilling the taxicab crankcase at 1000-2000 mile intervals.

The Sludge Inhibition Bench Test is conducted in the following manner: The aforesaid used crankcase oil, which is milky brown in color, is freed of sludge by centrifuging for 1 hour at about 39,000 gravities (gs.). The resulting clear bright-red supernatant oil is then decanted from the insoluble sludge particles thereby separated out. However, the supernatant oil still contains oil-soluble sludge precursors which on hearing under the conditions employed by this test will tend to form additional oil-insoluble deposits of sludge. The sludge inhibiting properties of the additives being tested are determined by adding to portions of the supernatant used oil, a small amount, such as 0.5, 1 or 2 weight percent, on an active ingredient basis, of the particular additive being tested. Ten grams of each blend being tested is placed in a stainless steel centrifuge tube and is heated at 138° C. for 16 hours in the presence of air. Following the heating, the tube containing the oil being tested is placed in a stainless steel centrifuge tube and is heated at 138° C. for 16 hours in the presence of air. Following the heating, the tube containing the oil being tested is cooled and then centrifuged for 30 minutes at about 39,000 gs. Any deposits of new sludge that form in this step are separated from the oil by decanting the supernatant oil and then carefully washing the sludge deposits with 25 ml. of pentane to remove all remaining oil from the sludge. Then the weight of the new solid sludge that has been formed in the test, in milligrams, is determined by drying the residue and weighing it. The results are reported as % of sludge dispersed by comparison with a blank not containing any additional additive. The less new sludge formed, the larger the value of percent sludge dispersant, and the more effective is the additive as a sludge dispersant. In other words, if the additive is effective, it will hold at least a portion of the new sludge that forms on heating and oxidation stably suspended in the oil so it does not precipitate down during the centrifuging. Using the above test, the dispersant activity of derivatized electrophilically terminated copolymers prepared in accordance with this invention were compared with the dispersing power of a dialyzed product obtained from dialysis of a commercial dispersant previously referred to as Lz3702. Sufficient dialyzed residue, which analyzed about 0.4 wt. % nitrogen, was dissolved in S-150N mineral oil to provide a 10% active ingredient concentrate. The dialyzed residue and polymer products of the invention were appropriately diluted in mineral oil to furnish the 0.05 and 0.1 wt. % of added additive to the used oil. The test results are given in Table I.

TABLE I

| Polymer of Example No. | Concentration gms. Polymeric Additive 10 g. Used Oil | % Sludge Dispersed |
|---|---|---|
| 1 | .1 | 50 |
|   | .05 | 10 |
| 3 | .1 | 51 |
|   | .05 | 34 |
| 5 | .1 | 84 |
|   | .05 | 68 |
| Lz3702 | .1 | 89 |
|   | .05 | 73 |

The results of Table I can be summarized as showing that the nitrogen-containing polymeric products of Examples 1 and 3 provide dispersancy at the 1 wt. % and 0.5 wt. % additive levels. The polymeric product of Example 5 provides dispersancy at the 1 and 0.5 wt. % additive levels comparable to that shown by a commercially available multifunctional V.I. improver.

The invention in its broader aspects is not limited to the specific details shown and described and departures may be made from such details without departing from the principles of the invention and with sacrificing its chief advantages.

What is claimed is:

1. A process of preparing an oil soluble sludge dispersing additive for lubricating oil comprising the steps of:
   (a) oxidizing a copolymer comprising principally ethylene and 20 to 80% propylene and having a ($\overline{M}n$) of from 1,000 to 500,000 to an oxygen content of from about 0.005 to 6% based on the weight of said copolymer;
   (b) forming an anion of said oxidized copolymer by reacting said oxidized copolymer in solution with an organolithium compound of the formula RLi, wherein R is selected from the group consisting of $C_2$ to $C_{20}$ alkyl, aralkyl and cycloalkyl groups;
   (c) reacting said anion with at least a molar equivalent of an electrophilic terminating compound of 1 to 60 carbons having the electron seeking group $C=O$ and which will introduce a reactive site for further reaction, and then further reacting through said reactive site with a member selected from the group consisting of amines of 2 to 60 carbons and 1 to 12 nitrogen atoms, and polymethylol alkanes, to thereby form said additive.

2. A process according to claim 1, wherein said electrophilic terminating compound has 1 to 30 carbon atoms and is selected from the group consisting of ketones, aldehydes, acid halides, and acid anhydrides.

3. A process according to claim 2, wherein said electrophilic terminating compound is further reacted with an amine.

4. A process according to claim 1, wherein said copolymer has a molecular weight of 10,000 to 200,000 and consists essentially of ethylene and propylene and has been oxidized to about 0.1 to 5.0 wt. % oxygen.

5. A process according to claim 4, wherein said copolymer which is oxidized consists of ethylene and propylene and wherein said anion has been produced by reaction of said oxidized copolymer in solution with an alkyl lithium compound of about 3 to about 10 carbons under anhydrous conditions.

6. A process according to claim 5, wherein said electrophilic terminating compound is further reacted with a polyamine.

7. A process according to claim 5, wherein said electrophilic terminating compound is methylchloroformate.

8. A process according to claim 6, wherein said amine is diethylene triamine.

* * * * *